Jan. 14, 1964 H. A. VOGEL 3,117,693

PLURAL RESIN COATED METAL ARTICLE

Filed Aug. 25, 1960

INVENTOR.
HENRY A. VOGEL
BY
Oscar H Spencer
ATTORNEY

United States Patent Office 3,117,693
Patented Jan. 14, 1964

---

3,117,693
PLURAL RESIN COATED METAL ARTICLE
Henry A. Vogel, Gibsonia, Pa., assignor to Pittsburgh Plate Glass Company, Pittsburgh, Pa., a corporation of Pennsylvania
Filed Aug. 25, 1960, Ser. No. 51,819
19 Claims. (Cl. 220—64)

This invention relates to a new coating system. More particularly, the invention relates to a new coating system for the interior of metallic beverage containers.

It has long been known that certain vinyl resins are particularly good for coating the inside of metal containers, especially hermetically sealed containers which are to be used for beverages, such as beer, carbonated drinks and juices, because of their excellent freedom from imparting taste to the contents. The vinyl halide polymers and copolymers of vinyl halides with vinyl acetate are among the most suitable for this use. However, they have only poor adhesion to metal substrates, such as tin-plated steel and aluminum. These vinyl resins are also usually sprayed on to the inside of the container after fabrication in order to obtain a continuous stress-free coating which is not likely to craze.

In order to overcome the above-mentioned lack of adhesion of vinyl resins and provide a good substrate for spraying, it has become necessary to use a base coat or primer with these vinyl resins. In addition to having good adhesion to tin plate, aluminum or other metal substrates, base coats must also have good flexibility in order to withstand fabrication techniques involved in making the containers, must have low extractability, must have good taste properties in the event the sprayed vinyl top coat is imperfect or marred so that the base coat is exposed, and must also have good scorch resistance during soldering of the can seam.

It has now been discovered that excellent container coatings which have the above-mentioned properties can be obtained through the use, as a base coat, of a heat hardenable, resinous composition comprising an aldehyde-modified interpolymer of a polymerizable unsaturated carboxylic acid amide with at least one monomer having a $CH_2=C<$ group, which interpolymer is reacted with an aldehyde, preferably in the presence of an alcohol. While these interpolymers may be used themselves, it is preferred that a modifying resin be blended therewith. A particularly useful class of modifying resins in the epoxy resins, although many other resins may also be employed.

The invention is carried out by applying the heat hardenable, resinous composition by roll coating, spraying or the like directly to tin-plated steel or to the finished can, and subsequently applying a vinyl resin to the surface of the coating of the resinous composition containing the aforementioned carboxylic acid amide interpolymer resin. Preferably, the base coat is substantially completely cured before the top coat (or coats) is applied; the container is then ready to be filled and sealed.

The aldehyde-modified carboxylic acid amide interpolymers which are to be employed with the instant invention are more fully described in application Serial No. 749,583, filed July 21, 1958, now U.S. Patent No. 3,037,963. The process disclosed in said copending application involves forming an interpolymer of an unsaturated carboxylic acid amide with at least one other polymerizable ethylenically unsaturated monomer and then reacting said interpolymer and an aldehyde, such as formaldehyde, preferably in the presence of an alcohol, such as butanol or the like. The resulting resins range from soft, flexible materials to very hard solids, depending on the choice of monomers utilized in preparing the amide interpolymer, which in turn is reacted with the aldehyde, and optionally with the alcohol.

In the preparation of the aldehyde-modified amide interpolymer resin, a polymerizable unsaturated carboxylic acid amide is polymerized with one or more ethylenically unsaturated monomers, and the resulting interpolymer reacted with an aldehyde. The exact mechanism whereby the amide interpolymers are obtained is not definitely known, but is believed to begin by the formation initially of a relatively short chain soluble interpolymer having an approximate structure as follows, acrylamide being utilized for illustrative purposes:

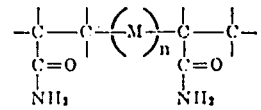

wherein M represents a unit of a monomer polymerizable with acrylamide, and n represents a whole number greater than 1. For example, if styrene were utilized as the second monomer, M would represent the unit

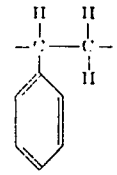

The short chain interpolymer then reacts with an aldehyde, as represented by formaldehyde, to give the structure

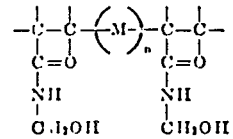

wherein M and n have the significance set forth hereinabove.

In the event the aldehyde is utilized in the form of a solution in butanol or other alkanol, etherification will take place so that at least some of the methylol groups in the above structure will be converted to groups of the structure

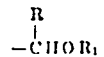

wherein R is a member selected from the class consisting of hydrogen and a saturated lower aliphatic hydrocarbon radical having its free valences on a single carbon atom, and $R_1$ is a member selected from the class consisting of hydrogen and the radical derived by removing the hydroxyl group from the alkanol.

It is particularly desirable that at least about 50 percent of the methylol groups be etherified since compositions having less than about 50 percent of the methylol groups etherified tend to be unstable and subject to gelation. Butanol is the preferred alcohol for use in the etherification process, although any alcohol, such as methanol, ethanol, propanol, pentanol, octanol, decanol, and other alkanols containing up to about 20 carbon atoms may also be employed as may aromatic alcohols, such as benzyl alcohol, or cyclic alcohols.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives such as N-carbamyl maleimide may also be utilized.

Any polymerizable monomeric compound containing at least one $CH_2=C<$ group may be polymerized with the unsaturated carboxylic acid amide. Examples of such monomers include the following:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene, 2-methyl-propene-1, 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2,4,4-trimethyl-pentene-1, 2-methyl-octene-1, 2,6-dimethyl-heptene-1, 2,6-dimethyl-octene-1, 2,3-dimethyl-decene-1, 2-methylnonadecene-1, ethylene, propylene, butylene, amylene, hexylene, butadiene-1,3, isoprene, and the like;

(2) Halogenated monoolefinic and diolefinic hydrocarbons, that is, monomers containings carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-fluoroethylene, 1,1-diiodoethylene, 1,1,2,2-tetrafluoroethylene, 1,1,2,2-tetrachloroethylene, 1-chloro-2,2,2-trifluoroethylene, chlorobutadiene and other halogenated diolefinic compounds;

(3) Esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate, and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate, and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohol, 1-butene-4-ol, 2-methyl-butene-4-ol, 2(2,2-dimethylpropyl)-1-butene-4-ol, and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate, and decyl alpha-cyano acrylate;

Dimethyl maleate, diethyl maleate, diallyl maleate, dimethyl fumarate, diethyl fumarate, dimethallyl fumarate, and diethyl glutaconate;

(4) Organic nitriles, such as acrylonitrile, methacrylonitrile, ethacrylonitrile, 3-octenenitrile, crotonitrile, oleonitrile, and the like;

(5) Acid monomers, such as acrylic acid, methacrylic acid, crotonic acid, 3-butenoic acid, angelic acid, tiglic acid, and the like.

It is to be understood that the above polymerizable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide component with those monomers which ordinarily form hard polymers, give hard and somewhat less flexible films, whereas interpolymers containing lower levels of the amide component with those monomers which ordinarily form soft homopolymers tend to be considerably softer. If more than one ethylenically unsaturated monomer is polymerized with the amide, the proportions of such additional monomers utilized will depend upon the characteristics which the monomer or monomers will impart to the final interpolymer.

The preparation of the amide interpolymer is described in detail in U.S. Patents 2,870,116 and 2,870,117, the disclosure of which is incorporated herein by reference.

The amide interpolymer resin prepared according to the disclosures in the above-identified patents is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethyltetramine is greatly preferred. However, other aldehydes including acetaldehyde, butyraldehyde, furfural, and the like, preferably containing only atoms of carbon, hydrogen and oxygen, can be used. Dialdehydes such as glyoxal and the like are preferably not employed, since they tend to cause the amide interpolymer resin to gel.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. The quantity of catalyst utilized may be varied widely; for example, as pointed out hereinabove, the more acidic the reaction medium, the greater the amount of etherification that will occur.

The reaction of the amide interpolymer with the aldehyde can be carried out simply by adding the aldehyde

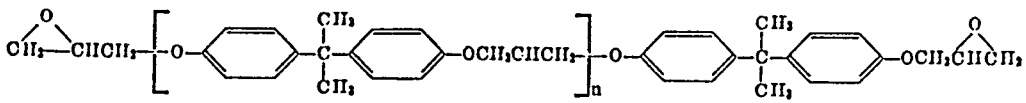 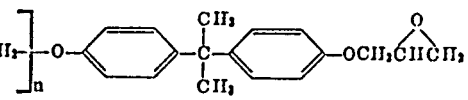

and the catalyst (if one be utilized) to the polymerization mixture obtained by polymerizing the amide and one or more ethylenically unsaturated monomers and refluxing the resulting mixture for a period of from about 3 to about 5 hours until the desired viscosity is obtained. The water of condensation can be removed by azeotropic distillation, as may a portion of the solvent if desired. In fact, when the aldehyde is utilized in the form of a solution in an alkanol such as butanol, it is desirable that approximately half of the butanol be distilled off at the end of the reaction period and replaced by another solvent, such as xylol. It is preferred that the final resinous material have a solids content of about 20 percent to 70 percent.

Similar polymeric materials may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the CH$_2$=C< monomers set forth hereinabove. This method, described in application Serial No. 775,380, filed November 21, 1958, now U.S. Patent No. 3,079,434, does not require reaction of the polymer with an aldehyde since the N-alkoxyalkyl amide monomers already contain

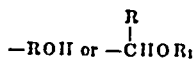

groups, wherein R and R$_1$ have the meaning set forth above.

Regardless of the method by which the resinous material is obtained, it will contain in the polymer chain recurrent groups of the structure

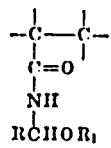

wherein R is hydrogen or a lower aliphatic hydrocarbon radical, and R$_1$ is hydrogen or the radical derived by removing the hydroxyl group from an alcohol. Thus, when the reaction is carried out in the presence of an alcohol, the alcohol reacts so that at least some, and preferably more than about 50 percent of the radicals R$_1$ will represent the radical derived by removing the hydroxyl group from the alcohol. When the aldehyde is utilized alone, that is, not in an alcohol solution, the radical R$_1$, of course, will represent hydrogen. The free valences in the above structure may be satisfied with either hydrogen or hydrocarbon depending upon the amide which is utilized in the interpolymerization reaction.

Particularly useful compositions include the blend of the aldehyde-modified interpolymer with an epoxy resin, such blends being disclosed in U.S. Patent No. 2,870,117. Epoxy compounds not containing a polyglycidyl ether structure can be employed, for instance, the epoxidized polydiolefins and epoxidized aromatic compounds are excellent modifying agents.

The polyglycidyl ethers of polyhydric compounds are preferably polyglycidyl ethers of dihydric phenols having as their sole functional groups epoxy and hydroxy groups. A representative epoxide resin structure may be illustrated as follows:

In the foregoing structure, $n$ is a number of the magnitude dependent upon the degree to which the etherification is carried. The epoxy resins are frequently characterized by molecular weight, and it has been found that those epoxy resins possessing a molecular weight above about 200 and preferably about 700 to 2000 are most suitable for combining with interpolymers of unsaturated carboxylic amides. However, epoxy resins having other molecular weights may also be utilized.

When an epoxy resin is blended with the amide interpolymers, amounts as low as about 5 percent by weight of the epoxy resin can be utilized, as can amounts as high as 40 percent or more of the epoxy resin. Preferably, the epoxy resin is utilized in an amount of about 10 percent to about 20 percent.

The vinyl resins which are to be used as top coats are preferably comprised of polymers of a vinyl halide, and include homopolymers such as polyvinyl chloride or polyvinyl bromide, as well as copolymers of a vinyl halide with a vinylidene compound, or a vinyl ester such as vinyl acetate, or the like. The preferred vinyl halide polymers are those which are polymers of vinyl chloride and vinyl acetate with at times, additions of a small portion of an unsaturated dicarboxylic acid such as maleic acid or fumaric acid, or internal modification to form hydroxyl groups. These vinyl resins may advantageously be blended with the aforementioned carboxylic-amide interpolymers for use as base coats. One particularly preferred resin contains approximately 86 percent vinyl chloride, approximately 12 percent of vinyl acetate, and approximately 1 percent of maleic acid. The vinyl resin can be blended with the amide interpolymer resin over extremely wide ranges. For example, either resin can be used in an amount of about 5 percent to 95 percent of the resin components, although preferably the vinyl resin is employed in an amount of about 5 percent to 75 percent by weight. These blends are disclosed in U.S. Patent No. 2,870,116.

As a further refinement of the instant invention, it is advantageous to incorporate a certain amount of a substance to impart color to the otherwise clear aldehyde-modified amide interpolymer composition, so that coating thicknesses may be easily observed and controlled. Certain phenolic or glycerol ester gums can be blended in large proportions (up to 40 percent) with these aldehyde-modified carboxylic acid amide interpolymer compositions to accomplish the desired result without significantly affecting the properties thereof. Preferably, the concentration should be within the range of from about 5 percent to about 17 percent. Amounts as low as 2 percent are, however, useful. Moreover, these ester gums are not toxic and will not exude from the base coat itself. The exact composition of such ester gums is not known, although a number of its properties have been determined. For example, one commercially available resin of this type sold by the Hercules Powder Company under the name "Vinsol Ester Gum" has the following properties:

Acid number, maximum _____ 20
Pounds per gallon at 25° C. _____ 9.98
Softening point, Hercules drop method, ° C. __ 140–155

In addition to imparting color to the amide interpolymer compositions, these glycerol and phenolic esters tend to increase slightly the adhesion to metal surfaces under food processing conditions.

It has been found that increasing the molecular weight of the aldehyde-modified carboxylic acid amide interpolymer improves the toughness of the base coat and therefore makes for better roll coating compositions. By adjusting the proportions of the different monomer constituents in the preparation of the interpolymer itself, the coating properties, such as flexibility, toughness and chemical resistance, may be varied. In order to prepare coatings having sufficient flexibility and toughness to withstand subsequent fabrication procedures, such as those involved in the preparation of a "tin can," a ternary internary interpolymer containing both a monomer which imparts hardness and a monomer which imparts flexibility should be employed. It is advantageous that the monomer which imparts hardness constitute less than 40 percent by weight of the interpolymer, but at least 10 percent and preferably between 20 and 30 percent by weight. Examples of the former are styrene, substituted styrenes and methyl methacrylate, while ethyl acrylate is an example of the latter.

Preferably, the coating systems of this invention are to be applied to tin plate. However, they are also useful as inner linings for black iron plate containers, particularly containers for frozen fruit juices. The coating compositions of this invention can also be applied to other metal containers or to metal surfaces in general; they are particularly adaptable for coating the inside of aluminum containers. Regardless of the type of metal employed, the films are baked for about 10 minutes at a temperature in the range of about 290° F. to 425° F. to obtain a satisfactory degree of cure.

For a description of the type of food and beverage containers on which the coating compositions of this invention may be utilized as an interior coating, reference is made to the accompanying drawing wherein.

Figure 1:
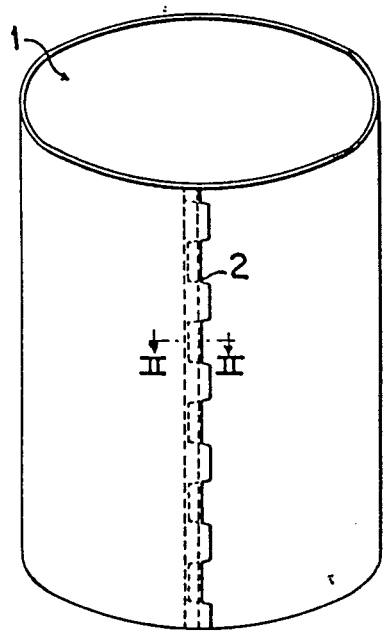
FIGURE 1 is an elevational view, partially in perspective, of a metal container for food or beverages.
Figure 2:
FIGURE 2 is a sectional view of a side seam of a food or beverage container taken along line II, II of FIGURE 1.

In FIGURE 1 there is shown a container for food or beverages 1, having a bottom, not shown, and a soldered side seam 2. In FIGURE 2 there is shown a container side seam having immediately adjacent the inner metallic surface 3 thereof, a baked-on film 4 of a resinous coating composition of an aldehyde-modified acrylamide interpolymer and an epoxide, and as a second resinous coat 5, immediately over base coat 4, a baked-on film either identical in composition to film 4, or of a vinyl resin or other type of coating composition. It will be noted that the interior folds of the side seam do not have film 5 over film 4. This is due to the fact that the first coat, in this case 4, is ordinarily applied before fabrication, whereas film 5 is normally applied after fabrication.

Figure 3:
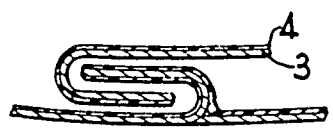
FIGURE 3 is an alternative embodiment of the side seam of FIGURE 2, also taken along line II, II of FIGURE 1.

In FIGURE 3, there is represented an exploded view of the container side seam 2 before final crimping is carried out and before film 5 is applied over film 4. It is to be understood, of course, that multi-coats of either the base materials or the top coat may be applied if desired.

The following examples are given by way of illustration and not by way of limitation. All parts and percentages are by weight unless otherwise specified.

*Examples I to IV*

These examples illustrate the preparation of aldehyde-modified amide interpolymers which can be used by themselves or blended with other polymers to form the base coating compositions of this invention. The polymerization in each example was carried out by mixing the polymerizable components, with a chain transfer agent, in a solvent such as butanol or xylene, and adding a polymerization catalyst, either initially or in increments throughout the polymerization reaction. The polymerization mixture was then refluxed (in a bomb when butadiene-1,3 is the monomer) for a period of time sufficient to obtain a conversion of substantially 100 percent. The polymerization charge, reflux time, interpolymer properties, formaldehyde condensation procedure, and the properties of the resinous condensation product are reported in the following table, wherein the letters have the following significance:

A—Benzoyl peroxide
B—Cumene hydroperoxide
C—Alpha-methyl styrene dimers
D—Tertiary dodecyl mercaptan

|  | EXAMPLE I | EXAMPLE II | EXAMPLE III | EXAMPLE IV |
|---|---|---|---|---|
|  | 15% Acrylamide, (A) 25% Methyl Methacrylate, (B) 60% Ethyl Acrylate | 20% Acrylamide, (A) 20% Methyl Methacrylate, (B) 60% Ethyl Acrylate | 15% Acrylamide, (A) 25% Styrene, (B) 60% Ethyl Acrylate | 5% Acrylamide, (A) 30% Styrene, (B) 65% Ethyl Acrylate |
| Polymerization charge and procedure: |  |  |  |  |
| Acrylamide | 15 | 40 | 15 | 5 |
| Monomer A | 25 | 40 | 25 | 30 |
| Monomer B | 60 | 120 | 60 | 65 |
| Catalyst | 1.0 B | 2 A | 1.0 B / 1.0 A | 3 B |
| Modifier | 1.0 D | 2 C | 1.0 D |  |
| Solvent: |  |  |  |  |
| h-Isobutanol | 100.0 | 200 | 100.0 | 50 |
| Xylene |  |  |  | 50 |
| Reflux time (hours) | 4 | 4 | 6 | 8 |
| Polymer properties: |  |  |  |  |
| Percent solids | 52.5 | 51.6 | 51.5 |  |
| Viscosity (Gardner) | $Z_3$ | $Z_3$–$Z_4$ | Z |  |
| Formaldehyde condensate, parts: |  |  |  |  |
| Butanol solution of formaldehyde | 31.70 | 84.6 | 31.70 | 15 (Isobutyl Formcel) |
| Maleic anhydride | 0.40 | 1.0 | 0.40 | 0.2 |
| Reflux time (hours) | 3 | 3½ | 3 |  |
| Final product: |  |  |  |  |
| Percent solids | 50.1 | 48.95 | 50.6 | 40.3 |
| Viscosity (Gardner) | Y | Y | U–V | Z |
| Color (Gardner) | 3–4 | <1 | 3–4 | 1 |

*Example V*

In this example an interpolymerizable mixture was prepared comprising:

| | Parts by weight |
|---|---|
| Acrylamide | 90 |
| Methacrylic acid | 15 |
| Ethyl acrylate | 264 |
| Styrene | 231 |
| n-Butanol | 300 |
| Toluene | 300 |

This mixture was refluxed for two hours at a temperature between 210° F. and 215° F. in the presence of 9 parts tertiary dodecyl mercaptan and 9 parts cumene hydroperoxide, 3 more parts of cumene hydroperoxide were then added and the mixture was refluxed at the same temperature for another two hours, after which were added 3 more parts of cumene hydroperoxide, 190.5 parts of butyl Formcel, and 2.6 parts maleic anhydride. This mixture was then distilled azeotropically for two hours to remove water, after which was added 3 more parts cumene hydroperoxide. The mixture was distilled azeotropically for another two hours and 3 more parts of cumene hydroperoxide were added, and a final azeotropic distillation was made to viscosity (Gardner-Holdt) of V-T. The resultant mixture was then filtered at 175° F. and the solids content was 50 percent and the viscosity (Gardner-Holdt) U to W.

*Example VI*

In accordance with this example, an interpolymerizable mixture of higher molecular weight was prepared comprising:

| | Parts by weight |
|---|---|
| Acrylamide | 10 |
| Ethyl acrylate | 65 |
| Styrene | 25 |
| n-Butanol | 50 |
| Solvesso 150 (aromatic hydrocarbon solvent—B.P. range 185°–200° C.) | 50 |

The above solution was refluxed at a temperature ranging from about 225° F. to 237° F. for two hours in the presence of 1 part cumene hydroperoxide, 0.5 part more cumene hydroperoxide was then added after each of three successive reflux intervals of two hours. After the fourth two-hour reflux interval, 0.5 part cumene hydroperoxide, 21 parts butyl Formcel and 0.3 part maleic anhydride were added to the mixture, which was azeotropically distilled for three hours to remove the formed water. The mixture was then cooled to 175° F., diatomaceous earth was added and the product was filtered at 175° F. The resulting resinous composition had a solids content of about 50 percent and a viscosity (Gardner-Holdt) ranging from Y to Z.

*Example VII*

Another resin was prepared in the same manner as the resin prepared in Example VI, except that the resinous mixture was cooled to 125° F. and combined with 31.1 parts of a 75 percent toluene solution of an epoxy resin (epoxide equivalent 425–525, M.P. 64–76°, viscosity C–G, 40 percent solution in butyl carbitol) and 15.6 parts Solvesso 150 (aromatic solvent, B.P. range 185–200° C.). The resulting resin had a solids content of about 50 percent and a viscosity (Gardner-Holdt) of W–Y.

*Example VIII*

The following example is drawn to the preparation of an interpolymer which is adaptable for spray coating techniques using the subsequent formulation:

| | Parts by weight |
|---|---|
| Styrene | 206 |
| Methacrylic acid | 6.25 |
| Acrylamide | 37.5 |
| Butanol | 125 |
| Toluene | 125 |

The above mixture was refluxed for two hours in the presence of 7.5 parts cumene hydroperoxide and 2.5 parts tertiary dodecyl mercaptan, then for three more sucessive two-hour reflux periods, after each of which was added 27 parts cumene hydroperoxide. After the fourth reflux period, 10 parts cumene hydroperoxide and 625 parts epoxy resin (epoxide equivalent 425–525) were added. This mixture was then refluxed for another hour, cooled to 180° F., and had a viscosity (Gardner-Holdt) of W–X and a 50 percent solids content.

*Example IX*

An interpolymer was prepared per mixture of the following materials.

| | Parts by weight |
|---|---|
| Acrylamide | 540 |
| Styrene | 1350 |
| Ethyl acrylate | 3510 |
| Solvesso 150 (aromatic solvent, boiling point range 185° C.–200° C.) | 2700 |
| n-Butanol | 2700 |

The above mixture was refluxed in the presence of 51 parts cumene hydroperoxide and 51 parts tertiary dodecyl mercaptan for four two-hour periods, after each of which were added 27 parts cumene hydroperoxide. The mixture was then cooled to about 210° F. and the fourth addition of 27 parts cumene hydroperoxide was added with 1134 parts butyl Formcel and 14.3 parts maleic anhydride. The mixture was then refluxed through a decanter for four hours after which 315 parts of an epoxy resin having the same properties as the epoxy resin used in Example VIII were added. This solution was then refluxed for one-half hour, cooled to 200° F. and filtered. The resulting resinous composition had a viscosity (Gardner-Holdt) of S to U and a 50 percent solids content.

If the vinyl is roll-coated the cans are fabricated with the vinyl coat thereon as follows; however, if the vinyl coat is sprayed, the can is fabricated first and the vinyl is then applied and baked on the finished can. The fabrication of the can is substantially the same when the vinyl coat is sprayed.

Can ends are die-stamped from this sheet stock having both base coat and a vinyl top coat baked thereon. Container blanks are cast from stock coated with base coat only and fabricated into cylindrical sheets to be solder-welded to form the body of the container. The vinyl coating composition is then applied by spray and baked at as high a temperature as could be tolerated without softening the solder at the seam and adversely affecting the lithographic inks on the exterior surface.

The bottom end closure is then double seamed to the tubular wall using a seam sealing compound to insure a hermetic seal. After filling, the top closure is also double seamed.

Such a container is filled with beer, hermetically sealed and thereafter the packaged beer is subjected to pasteurization and other normal processing operations. After the containers are pasteurized and subjected to storage, they are opened and the lining is examined for corrosion failures. The following are some of the more important tests which have been developed to measure the requirements of resinous can and closure coatings for beverages.

A—Metal adhesion
    B.—Flexibility and fabrication
    C.—Vinyl adhesion
    D—Blush resistance
    E—Solvent resistance
    F—Flavor and odor freedom
    G—Side seam solder resistance
    H—Natural gold color The following examples are illustrative of compositions that may be used in the can coating procedure discussed above. All parts and percentages are by weight unless otherwise specified.

*Example X*

The following components were blended into a homogeneous mixture:

| | Parts by weight |
|---|---|
| Polymer of Example VI | 31 |
| Vinsol ester gum | 4 |
| Solvent (mixture for roll-coating applications given below) | 65 |

The solvent mixture for roll-coating application of the composition consisted of the following:

| | Parts by weight |
|---|---|
| Xylol | 25 |
| Butanol | 25 |
| High boiling hydrocarbon solvent—B.P. 175–205° C. (Shell TS-28) | 25 |
| High boiling hydrocarbon solvent—B.P. 160–205° C. (Enjay 150) | 25 |

*Example XI*

| | Parts by weight |
|---|---|
| Polymer of Example V | 27.5 |
| Vinsol ester gum | 4 |
| Epoxy resin (epoxide equivalent 450–525° C.—M.P. 64–79) | 3.5 |
| Solvent (same as in Example X) | 65 |

*Example XII*

| | Parts by weight |
|---|---|
| Polymer of Example VII | 28 |
| Vinsol ester gum | 5 |
| Solvent (same as in Example X) | 67 |

These coating compositions were applied by roll-coating on sheet metal at a coating weight of 3 to 4 milligrams per square inch and baked for about 10 minutes at an oven temperature of about 400° F.

A typical vinyl coating composition for use as a top coat for the internal coating of metal containers consisted of the following:

*Example XIII*

| | Parts by weight |
|---|---|
| Vinyl chloride-vinyl acetate copolymer | 20 |
| Solvent (for roll-coatings given below) | 80 |

The copolymer contained 85 percent vinyl chloride and 15 percent vinyl acetate.

The solvent mixture for roll-coating application consisted of the following:

| | Parts by weight |
|---|---|
| Toluol | 45 |
| Xylol | 10 |
| Methyl isobutyl ketone | 40 |
| Isophorone | 5 |

*Example XIV*

| | Parts by weight |
|---|---|
| Vinyl chloride-vinyl acetate (same 85/15 copolymer as used in Example XIII) | 20 |
| Solvent (for spray coatings given below) | 80 |

An alternative solvent mixture for spray application consisted of the following:

| | Parts by weight |
|---|---|
| Toluol | 40 |
| Xylol | 10 |
| Methyl ethyl ketone | 50 |

The following table of results will indicate the superiority of the acrylamide interpolymer resins when used as a beverage base coat as against a conventional varnish base coat.

Definitions of the tests used in the above table are as follows:

*Adhesion.*—The baked coating is first scored with a knife edge and the score is then covered with Scotch tape which is removed. The area proximate to the score is then examined to determine the amount of coating material which is removed with Scotch tape. The amount of coating material which comes off with the Scotch tape is indicative of the adhesion.

*Side seam scorch.*—This test comprises dipping the coated substrate into a solder bath having a temperature of 650 to 700° F. for 3–5 seconds. The degree of darkening is used as a measure of decomposition of the coating material.

*Can end fabrication.*—No. 303 can ends are die-stamped with base coat and base coat plus top coat, and then subjected to acidic copper sulphate for 5 minutes. If the fabricating has cracked the coating, there will be an electrolytic exchange of the metal of the can for the copper combined as copper sulphate; the free copper is the plate on the cracked areas. The amount of deposited copper is used as a measure of cracking, which in turn is an indication of flexibility and ability to withstand fabrication.

*Flavor test.*—This test is carried out by pasteurizing the coated substrates in distilled water and beer and tasted by at least ten individuals. Distilled water and beer are used as a standard to determine any changes in flavor which may be imparted by the subject coating.

*Blush resistance.*—This test is carried out by placing the coated substrates in water having a temperature of 150° F. for 90 minutes. The "blush" of the coating is measured by the degree of whitening which occurs in the coating.

In addition to the aforementioned use as a base coat for a vinyl resin top coat in beverage containers, other resin blends are useful as base coats for top coats composed of numerous other resins. For instance, a blend comprising 90 parts of an acrylamide interpolymer containing 10 percent acrylamide, 25 percent styrene, and 65 percent ethyl acrylate, 10 parts of a butylated formaldehyde condensation product of butenylphenol (these products are prepared in U.S. 2,907,751) and 2.5 parts vinyl chloride resin (VAGH), and 22 parts of an epoxy resin (epoxide equivalent 300–375, M.P. 40–45° C., viscosity Gardner-Holdt A–B as 40 percent solution in butyl carbitol) can be advantageously employed as a base coat within the comprehension of the present invention.

Using the same acrylamide interpolymer as above, another useful blend is obtained from 50 parts of the acrylamide interpolymer, 70 parts of the polybutneyl phenol, 25 parts polyvinyl chloride (VAGH), and 75 parts epoxy resin (Epon 864) in methyl isobutyl ketone. It has also been found advantageous to blend the instant aldehyde-modified acrylamide interpolymer with small amounts of polyamides. These polyamides are condensation products of an unsaturated fatty acid and a dialiphatic amine with molecular weights ranging from 3,000

| Coating | Adhesion of Base Coat to Metal Base | Side Seam Scorch | Can End Fabrication | Adhesion of Vinyl Top Coat to Base Coat | Flavor Test | Blush Resistance |
|---|---|---|---|---|---|---|
| Control [1] (Base coat) | Good | Poor | Good | | Poor | Excellent. |
| Example X (Base coat) | Excellent | Good | do | | Good | Do. |
| Example XI (Base coat) | do | do | do | | Do. | Do. |
| Example XII (Base coat) | do | do | Fair | | Excellent | |
| Control [1] (Base coat and top coat) | Good | | Excellent | Good | Good | Good. |
| Example X (Base coat and top coat) | Excellent | | do | do | do | Do. |
| Example XI (Base coat and top coat) | do | | do | do | do | Do. |
| Example XII (Base coat and top coat) | do | | do | do | do | Do. |
| Vinyl top coat (only) | Poor | Poor | do | Poor | Excellent | Poor. |

[1] A typical varnish for use as a base coat for the interior base liner consisting essentially of a maleic anhydride-polyhydric alcohol ester resin, Chinawood oil and linseed oil with iron linoleate and manganese naphthenate present as oxides.

to 10,000. One example of a useful composition is a mixture of 63 parts of the above acrylamide interpolymer, 7 parts of the polyamide Versamid 115 (condensation product of linoleic acid and ethylene diamine having an amine value of 210–230, a viscosity of 400 to 750 poises and an acid value of 7), 7 parts epoxy resin (epoxide equivalent 450–525, M.P. 64–76° C., viscosity C–G, in 40 percent butyl carbitol solution) and 50 parts of a solvent mixture containing 1:1 proportions of methyl isobutyl ketone and isophorone.

Copending application Serial No. 65,938 filed October 31, 1960 discloses certain blends of the aldehyde-modified acrylamide interpolymers used in the present invention with certain butadiene/styrene copolymers. It has been found that these resinous blends are particularly adaptable to be used as base coats within the scope of the present invention, especially where flame cure is to be employed. One particular blend which may be employed as a flame curing composition consists of 25 parts of an acrylamide copolymer containing 10 percent acrylamide, 5 percent acrylic acid, 60 percent ethyl acrylate and 25 percent styrene, with 75 parts of a maleic anhydride modified 80–20 polybutadiene styrene copolymer.

One particular composition having excellent adhesion and taste properties, which in many instances may be used as a single coat beverage liner, is made from 47.2 parts of the polymer of Example VII and 47.2 parts polyvinyl chloride (VMCH) with or without 5.6 parts Vinsol ester gum.

In addition to the straight vinyl chloride-vinyl acetate copolymers, various blends of vinyl resins with the aldehyde-modified acrylamide copolymers of the instant invention may also be used as top coats. Other top coats may be composed of epoxy resins blended with vinyl resins and phenolic resins blended with vinyl resins. More operative top-coat compositions are found in U.S. 2,324,078, U.S. 2,675,334 and U.S. 2,699,413.

Compositions other than vinyl resins having particular utility as top coats are listed as follows:

Polydiolefins
Amine formaldehyde condensation products (melamine formaldehyde, etc.)
Epoxy resins
Phenolics
Alkyd resins
Cellulosic resins
Shellac The above resins coating systems have wide application; for example, they are useful as detergent containers, oil containers and other various liquid and even solid containers.

Obviously, a great many other aldehyde-modified acrylamide interpolymers may be utilized in place of those specified in the examples. Similarly, other resins selected from those disclosed hereinabove may be substituted for the resins which were blended in the examples. Modifications in the solvent systems may also be made.

I claim:

1. An article comprising a metal surface having thereon a coating system including a layer of (1) a resinous composition comprising a heat hardenable resinous composition containing an interpolymer of an unsaturated carboxylic acid amide with at least one monomer having a $CH_2=C<$ group, said interpolymer being characterized by having amido hydrogen atoms replaced by the structure

wherein R is a member of the class consisting of hydrogen and hydrocarbon radicals and $R_1$ is a member selected from the class consisting of hydrogen and a lower alkyl radical, and (2) a layer comprising a non-toxic, substantially tasteless, acid resistant resinous composition.

2. A container having a surface coated with the coating system of claim 1.

3. An article comprising a metal surface having thereon a coating system including a layer of (1) a resinous composition comprising a heat hardenable resinous composition containing an interpolymer of an unsaturated carboxylic acid amide with at least one monomer having a $CH_2=C<$ group, said interpolymer being characterized by having amido hydrogen atoms replaced by the structure

wherein R is a member of the class consisting of hydrogen and hydrocarbon radicals and $R_1$ is a member selected from the class consisting of hydrogen and a lower alkyl radical, and (2) a layer comprising a vinyl resin.

4. The article of claim 3 wherein the said amide interpolymer contains from about 2 percent to about 50 percent acrylamide.

5. A container having a surface coated thereon with the coating system of claim 4.

6. The article of claim 3 wherein the resinous composition comprises an interpolymer comprising acrylamide and styrene.

7. The article of claim 3 wherein the resinous composition comprises an interpolymer comprising acrylamide, styrene and ethyl acrylate.

8. The article of claim 3 wherein the resinous composition comprises an interpolymer comprising acrylamide and methyl methacrylate.

9. The article of claim 3 wherein the resinous composition comprises an interpolymer comprising acrylamide and vinyl toluene.

10. The article of claim 3 wherein the resinous composition comprises an interpolymer comprising acrylamide, styrene and butadiene.

11. The article of claim 3 wherein the said resinous composition contains from about 2 percent to about 40 percent of an ester gum.

12. The article of claim 3 wherein the vinyl resin is a vinyl halide resin.

13. The article of claim 3 wherein the said layer (2) is a resinous composition comprising from about 5 percent to about 95 percent of a vinyl halide resin and from about 95 percent to about 5 percent of said interpolymer of an unsaturated carboxylic acid amide with at least one other monomer having a $CH_2=C<$ group.

14. A metallic container adapted to contain a beverage, said container having its interior coated with a heat hardenable resinous composition comprising from about 5 to about 40 percent of an epoxy resin and 95 percent to about 60 percent of a monoaldehyde-substituted interpolymer of a carboxylic acid amide with at least one other monomer having a $CH_2=C<$ group, said interpolymer being characterized by having amido hydrogen atoms replaced by the structure

wherein R is selected from the class consisting of hydrogen and hydrocarbon radicals and $R_1$ is selected from the class consisting of hydrogen and lower alkyl radicals, said monoaldehyde containing only atoms of carbon, hydrogen and oxygen, the coating of said resinous composition being further coated with a vinyl resin.

15. The metallic container of claim 14 wherein the epoxy resin is a polyglycidyl ether of a diphenol having a molecular weight of about 200 to 1,000.

16. The metallic container of claim 14 wherein the said resinous composition contains from about 2 percent to about 40 percent of an ester gum.

17. An article comprising a metal surface having thereon a coating system including a layer of (1) a resinous composition comprising from about 5 to about 40 percent of an epoxy resin and from about 95 percent to about 60 percent of an interpolymer of acrylamide and at least one other monomer containing $CH_2=C<$ group, said interpolymer containing about 2 percent to 50 percent acrylamide by weight in polymerized form based upon the total weight of said interpolymer and (2) a layer of resinous composition comprising a vinyl halide resin.

18. An article comprising a metal surface having thereon a coating system including a layer of (1) a resinous composition comprising (a) from about 80 percent to 90 percent of an interpolymer comprising from about 2 percent to about 50 percent acrylamide, from about 10 percent to about 40 percent styrene, and from about 10 percent to about 70 percent ethyl acrylate, and (b) from about 20 percent to 10 percent of a polyglycidyl ether of a diphenol and (2) a layer of a resin comprising from about 50 percent to 100 percent of a polyvinyl halide and from about 50 percent to 0 percent of polyvinyl acetate.

19. The article of claim 18 wherein the said resinous composition contains from about 2 percent to about 40 percent of an ester gum.

References Cited in the file of this patent

UNITED STATES PATENTS

| | | |
|---|---|---|
| 2,630,420 | Gleim | Mar. 3, 1953 |
| 2,671,059 | Smit | Mar. 2, 1954 |
| 2,933,413 | Goldstein | Apr. 19, 1960 |
| 2,949,383 | Blake | Aug. 16, 1960 |

UNITED STATES PATENT OFFICE
CERTIFICATE OF CORRECTION

Patent No. 3,117,693                                                January 14, 1964

Henry A. Vogel

It is hereby certified that error appears in the above numbered patent requiring correction and that the said Letters Patent should read as corrected below.

Column 13, lines 70 to 72, the formula should appear as shown below instead of as in the patent:

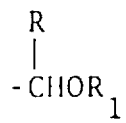

Signed and sealed this 27th day of July 1965.

(SEAL)
Attest:

ERNEST W. SWIDER                                        EDWARD J. BRENNER
Attesting Officer                                           Commissioner of Patents